(12) United States Patent
Denninger et al.

(10) Patent No.: US 9,308,889 B1
(45) Date of Patent: Apr. 12, 2016

(54) SHOULDER BELT GUIDE WITH STOW FEATURE

(71) Applicants: Melinda M Denninger, Oxford, MI (US); Paul C Tresnak, Royal Oak, MI (US); Rachel Cacossa, Shelby Township, MI (US)

(72) Inventors: Melinda M Denninger, Oxford, MI (US); Paul C Tresnak, Royal Oak, MI (US); Rachel Cacossa, Shelby Township, MI (US)

(73) Assignee: FCA US LLC, Aubhurn Hills, MI (US)

( * ) Notice: Subject to any disclaimer, the term of this patent is extended or adjusted under 35 U.S.C. 154(b) by 0 days.

(21) Appl. No.: 14/538,296

(22) Filed: Nov. 11, 2014

(51) Int. Cl.
*B60R 22/02* (2006.01)
*B60R 22/24* (2006.01)
*B60R 22/19* (2006.01)
*B60R 22/18* (2006.01)

(52) U.S. Cl.
CPC .............. *B60R 22/24* (2013.01); *B60R 22/023* (2013.01); *B60R 22/19* (2013.01); *B60R 2022/029* (2013.01); *B60R 2022/1818* (2013.01)

(58) Field of Classification Search
CPC B60R 22/03; B60R 2022/1818; B60R 22/02; B60R 2022/021; B60R 22/022; B60R 22/023; B60R 22/024; B60R 22/24; B60R 22/19
USPC .......................................... 297/483; 280/808
See application file for complete search history.

(56) References Cited

U.S. PATENT DOCUMENTS

| | | | | |
|---|---|---|---|---|
| 3,567,247 | A | * | 3/1971 | Sobkow ................ B60R 22/024 280/808 |
| 4,648,625 | A | | 3/1987 | Lynch |
| 4,799,737 | A | * | 1/1989 | Greene ................. B60R 22/024 280/808 |
| 5,060,976 | A | * | 10/1991 | Boone ..................... B60R 22/22 280/801.1 |
| 5,308,116 | A | | 5/1994 | Zawisa et al. |
| 7,513,532 | B1 | | 4/2009 | Vaughns, Sr. et al. |
| 9,039,096 | B2 | * | 5/2015 | Nakanishi ............... B60R 22/18 297/481 |
| 2006/0119092 | A1 | * | 6/2006 | Downey ................ B60R 22/024 280/808 |
| 2010/0301594 | A1 | * | 12/2010 | Hathaway ............... B60R 22/26 280/808 |
| 2013/0033029 | A1 | * | 2/2013 | Hill ........................ B60R 22/14 280/808 |

FOREIGN PATENT DOCUMENTS

| | | | |
|---|---|---|---|
| EP | 1 987 992 A1 | * | 11/2008 |
| FR | 2 692 533 A1 | * | 12/1993 |
| JP | 5259849 B2 | * | 8/2013 |

* cited by examiner

*Primary Examiner* — Ruth Ilan
(74) *Attorney, Agent, or Firm* — Ralph E. Smith (57) ABSTRACT

The present teachings provide for a seatbelt positioner for a vehicle that includes a pillar and seatbelt. The seatbelt positioner can include a receiver, a router, and a tether. The receiver can be coupled to the pillar. The router can include a guide body and a stowage member. The router can be movable between a stowed position and an extended position. The guide body can be configured to releasably couple the router to a chest restraint of the seatbelt. When the router is in the stowed position the stowage member can couple the guide body to the receiver. The tether can have a first end coupled to the router and a second end coupled to the receiver. When the router is in the extended position the tether biases the router in a direction toward the receiver.

20 Claims, 3 Drawing Sheets

SHOULDER BELT GUIDE WITH STOW FEATURE

FIELD

The present disclosure relates to seatbelt positioners with a stowage feature.

BACKGROUND

This section provides background information related to the present disclosure and is not necessarily prior art.

Vehicles conventionally have a seat configured for an occupant to sit in a passenger compartment of the vehicle, and a seatbelt configured to restrain the passenger in the seat. Seatbelts typically include a webbing material that forms a lap restraint, and a chest restraint. The lap restraint is configured to span the occupant's lap to restrain the occupant proximate to his/her lap. The chest restraint is configured to cross the occupant's chest diagonally from the occupant's shoulder, to his/her lap. A first end of the webbing is typically coupled to the vehicle body on one side of the seat proximate to the floor of the vehicle. A second end of the webbing is typically routed through a webbing guide mounted to a vertical pillar of the vehicle on the same side of the seat and proximate to a header of the vehicle. The lap and chest restraint portions of the webbing are delineated by a buckle configured to slide along the webbing and to releasably couple the webbing to a mating buckle that is mounted to the vehicle proximate to the floor on an opposite side of the seat. Proper positioning of the chest restraint across the occupant's chest can be important for proper restraint of the occupant. Proper positioning of the chest restraint can be difficult for occupants of smaller stature. Furthermore, when the seatbelt is not buckled, the webbing is free to catch on the seat or become caught behind the seat, thus inhibiting the reclining, folding or other positioning of the seat, as well as inhibiting access to the seatbelt.

SUMMARY

This section provides a general summary of the disclosure, and is not a comprehensive disclosure of its full scope or all of its features.

The present teachings provide for a seatbelt positioner for a vehicle that includes a pillar and a seatbelt. The seatbelt positioner can include a receiver, a router, and a tether. The receiver can be coupled to the pillar. The router can include a guide body and a stowage member. The router can be movable between a stowed position and an extended position. The guide body can be configured to releasably couple the router to a chest restraint of the seatbelt. When the router is in the stowed position the stowage member can couple the guide body to the receiver. The tether can have a first end coupled to the router and a second end coupled to the receiver. When the router is in the extended position the tether biases the router in a direction toward the receiver.

The present teachings further provide for the guide body being generally C-shaped. The portion of the seatbelt can be removably received through an opening of the C-shaped guide body.

The present teachings further provide for the stowage member being coupled to the guide body on a side of the guide body opposite the opening.

The present teachings further provide for the receiver including a pair of tabs spaced apart to define a trough. The stowage member can include a protrusion and a hitch. The protrusion can extend away from the side of the guide body. The hitch can be spaced apart from the guide body by the protrusion. When the router is in the stowed position, the protrusion can be received in the trough and the hitch can be disposed on a side of the tabs opposite the guide body.

The present teachings further provide for the hitch being wider than the trough to prevent axial translation of the router relative to the receiver when the router is in the stowed position.

The present teachings further provide for the tabs further defining a receiving aperture open to the trough. The receiving aperture can widen with increased distance from the trough.

The present teachings further provide for the tether being formed of a resilient material configured to be biased toward a first length when stretched to a second length that is longer than the first length.

The present teachings further provide for the stowage member including a first portion and the receiver including a second portion that contacts the first portion when the router is in the stowed position. At least one of the first and second portions can be formed of a resilient material.

The present teachings further provide for the receiver being defined by a portion of the pillar.

The present teachings further provide for the receiver being mounted to the pillar.

The present teachings further provide for a seatbelt positioner for a vehicle that includes a pillar and seatbelt. The seatbelt positioner can include a receiver, a router, and a tether. The receiver can be coupled to the pillar. The router can be movable between an extended position and a stowed position. The router can include a guide body and a stowage member. The guide body can have a generally C-shape defining a main channel. The main channel can be configured to retain a portion of the seatbelt. The stowage member can extend from the guide body. The tether can be coupled to the router and the receiver. When the router is in the extended position, the router can be spaced apart from the receiver and can be biased in a direction toward the receiver. When the router is in the stowed position, the stowage member can be received in the receiver and the guide body can be configured to couple the router to the portion of the seatbelt.

The present teachings further provide for the stowage member extending from a side of the guide body that is opposite the main channel.

The present teachings further provide for the receiver including a first aperture of a first width. The stowage member can include a protrusion and a hitch. The protrusion can have a second width. The hitch can be spaced apart from the guide body by the protrusion and can have a third width that is greater than the first and second widths. When the router is in the stowed position, the protrusion can be received in the first aperture and the hitch can be disposed on a side of the first aperture opposite the guide body.

The present teachings further provide for the receiver including a second aperture that is open to the first aperture. The second aperture can have a fourth width that is greater than the third width.

The present teachings further provide for the first and second apertures being connected by a pair of ramps.

The present teachings further provide for the tether being formed of a resilient material configured to be biased toward a first length when stretched to a second length that is longer than the first length.

The present teachings further provide for the stowage member including a first portion and the receiver including a second portion that contacts the first portion when the router is in the stowed position. At least one of the first and second portions can be formed of a resilient material.

The present teachings further provide for the receiver being defined by a pillar trim panel.

The present teachings further provide for the receiver being mounted to the pillar.

The present teachings further provide for the tether being rotatably coupled to the receiver Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 1, 2:
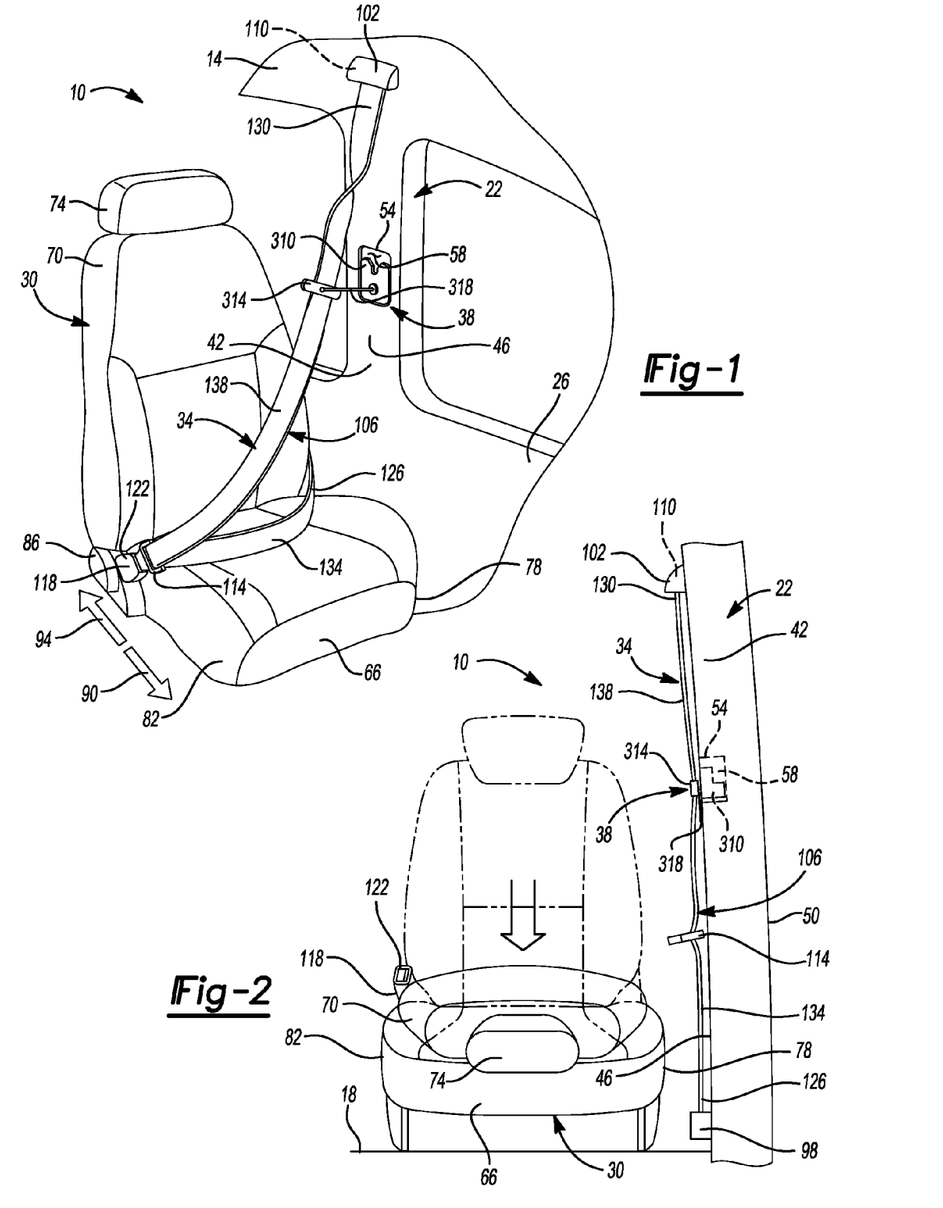
FIG. 1 is a perspective view of a portion of a vehicle including a pillar and a seatbelt positioner of a first construction and in an extended position in accordance with the present disclosure.
FIG. 2 is a front view of the portion of the vehicle and the seatbelt positioner of FIG. 1 in a stowed position.

With reference to FIGS. 1 and 2, a portion of a vehicle 10 is illustrated. The vehicle 10 can be any type of vehicle, such as an automobile, truck, sport utility vehicle, recreational vehicle, bus, or military vehicle for example. The vehicle 10 includes a header 14, a floor 18, a pillar 22, a door 26, a seat 30, a restraint system 34, and a restraint positioner 38.

The header 14 extends longitudinally along the top of the vehicle 10 and supports a roof (not shown) of the vehicle 10. The floor 18 is spaced apart from the header 14 and extends along the bottom of the vehicle 10, proximate to the ground (not shown) during normal operation of the vehicle 10. The pillar 22 is coupled to the header 14 and the floor 18 and extends generally vertically therebetween to support the header 14. In the example provided, seat 30 is a front seat 30 and the pillar 22 is a B-pillar of the vehicle 10, though other seat locations and appropriate pillars can be used. The door 26 is framed by the pillar 22, the header 14, the floor 18, and an additional pillar (not shown) such as an A-pillar for example. The door 26 is configured to permit ingress and egress of an occupant (not shown) from the vehicle 10.

Figure 4:
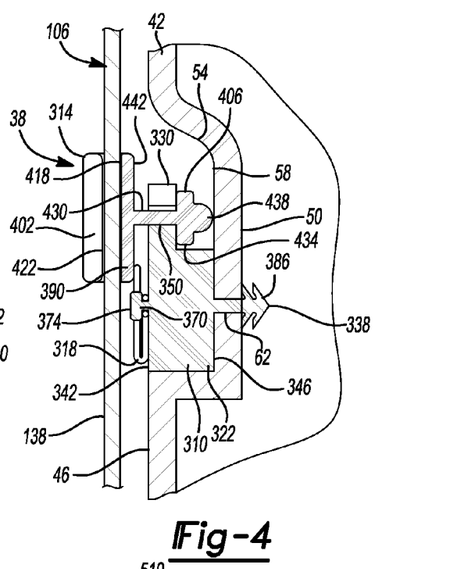
FIG. 4 is a sectional view of the seatbelt positioner of FIG. 3 taken along line 4-4, with a seatbelt router in a stowed position.

The pillar 22 includes a pillar trim panel 42. The pillar trim panel 42 can be formed of a thermoplastic material, for example, and has an interior side 46 that faces generally into a passenger compartment or interior of the vehicle 10 and an exterior side 50 that faces generally away from the interior of the vehicle 10. The interior side 46 of the pillar trim panel 42 includes a cavity 54 that has a recessed surface 58. The recessed surface 58 is recessed toward the exterior of the vehicle 10 relative to the interior side 46 of the pillar trim panel 42. The recessed surface 58 includes an aperture 62 (FIG. 4) penetrating through the interior and exterior sides 46, 50.

The seat 30 is configured to permit the occupant to sit within the vehicle 10. The seat 30 includes a lower support 66, an upper support 70, and a head rest 74. The seat 30 has a first side 78 proximate to the pillar 22 and a second side 82 opposite the first side 78 and distal to the pillar 22. The lower support 66 is configured to be sat on by the occupant to support the occupant above the floor 18. The upper support 70 is configured to extend generally vertically from the lower support 66 when the seat 30 is in an upright position (FIG. 1), to provide support to the occupant's back and upper body. The upper support 70 is joined to the lower support 66 by a first seat mechanism 86. The first seat mechanism 86 is configured to permit the upper support 70 to move or rotate relative to the lower support 66 between various positions, such as an upright position (FIG. 1), a reclined position (not shown), or a folded position (shown in solid lines in FIG. 2). The head rest 74 is configured to extend generally vertically from the upper support 70 when the seat 30 is in the upright position (FIG. 1), to provide support for the occupant's head. The seat 30 is coupled to the floor 18 by a second seat mechanism (not shown). The second seat mechanism is configured to permit the seat 30 to move relative to the floor 18 in a forward direction 90 and a rearward direction 94. While illustrated as a single occupant seat, the seat 30 can alternatively be configured to support multiple occupants, such as with a bench seat for example.

The restraint system 34 includes a lower mount 98, an upper mount 102, a seatbelt 106, a retracting mechanism 110, a buckle 114, a buckle arm 118, and a mating buckle 122. The lower mount 98 is coupled to the vehicle 10 proximate to the first side 78 of the seat 30 and proximate to the floor 18. For example, the lower mount 98 can be mounted to the floor 18 at the first side 78 of the seat 30 or to the pillar 22 proximate to the floor 18. The upper mount 102 is coupled to the vehicle 10 on the first side 78 of the seat 30 and proximate to the header 14. For example, the upper mount 102 can be mounted to the header 14 or to the pillar 22 proximate to the header 14.

The seatbelt 106 is formed of a webbing material or fabric and has a first end 126 and a second end 130. The first end 126 is coupled to the vehicle 10 at the lower mount 98. The second end 130 is coupled to the vehicle 10 at the upper mount 102. In some configurations, the upper mount 102 can be a guide through which the seatbelt 106 is slidably routed to a third mount (not shown) that can be mounted to the pillar 22 between the upper mount 102 and the floor 18.

The buckle 114 is coupled to the seatbelt 106 such that the buckle 114 slides along the seatbelt 106. The location of the buckle 114 delineates the seatbelt 106 into a lap portion 134 and a chest portion 138, such that the lengths of the lap and chest portions 134, 138 vary depending on the position of the buckle 114 along the seatbelt 106. The lap portion 134 is configured to span the occupant's lap to restrain the occupant in the seat 30 proximate to the occupant's waist. The chest portion 138 is configured to cross the occupant's chest diagonally, such as from the occupant's shoulder to the occupant's waist.

The buckle arm 118 is coupled to the vehicle 10 on the second side 82 of the seat 30 and proximate to the floor 18. For example, the buckle arm 118 can be mounted to the second side 82 of the seat 30 near a junction of the lower and upper supports 66, 70, or to the floor 18 near the second side 82 of the seat 30. The mating buckle 122 is mounted to the buckle arm 118 and configured to releasably latch or connect to the buckle 114 to hold the seatbelt 106 in a connected position (FIG. 1).

In the example provided, the retracting mechanism 110 is located at the upper mount 102 and can wind the seatbelt 106 around a spool (not shown). In some configurations, the retracting mechanism 110 could be disposed at any other suitable location, such as at the lower mount 98 or at a location between the upper and lower mounts 102, 98 for example. The retracting mechanism 110 is configured to retract the seatbelt 106 and to permit extension of the seatbelt 106. The retracting mechanism 110 is configured to inhibit extension of the seatbelt 106 during sudden deceleration of the vehicle 10, such as during a crash event for example.

Figure 3:
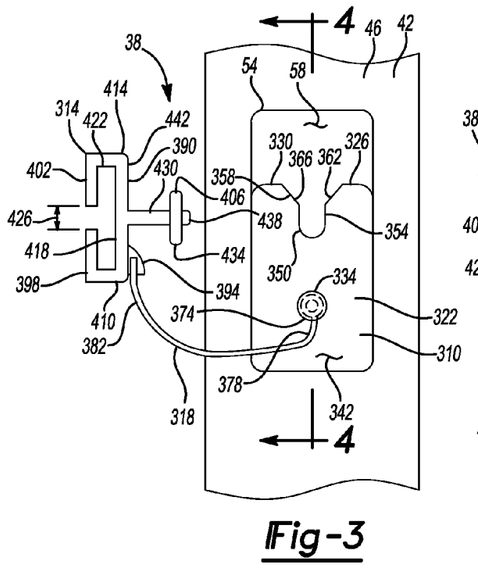
FIG. 3 is a front view of a portion of the pillar and the seatbelt positioner of FIG. 2 having a receiver of a first construction.

With additional reference to FIG. 3, a front view of a portion of the pillar trim panel 42 is shown with the restraint positioner 38. With additional reference to FIG. 4, a sectional view of a portion of the pillar trim panel 42 and seatbelt 106 is illustrated with the restraint positioner 38 in a stowed position. The restraint positioner 38 includes a receiver 310, a seatbelt router 314, and a tether 318. The receiver 310 includes a main body 322 a first tab 326, a second tab 330, an anchor 334, and a fastener 338. The main body 322 is configured to be received in the cavity 54 and mounted therein to the pillar trim panel 42. In the example provided, the main body 322 is a generally rectangular shape, though other shapes can be used. The main body 322 includes an exterior face 342 configured to oppose and abut the recessed surface 58, and an interior face 346 configured to be generally flush with the interior side 46 of the pillar trim panel 42 when the main body 322 is received in the cavity 54 and the exterior face 342 abuts the recessed surface 58.

The first and second tabs 326, 330 extend outward from the main body 322 generally toward the header 14 when the main body 322 is received in the cavity 54. The first and second tabs 326, 330 can be generally flush with the interior face 346 when the main body 322 is mounted to the pillar 22. The first and second tabs 326, 330 are spaced apart from one another to define a trough 350 that can open toward the header 14. The trough 350 has a first portion 354 where the first and second tabs 326, 330 are a first distance apart. The trough 350 has a second portion 358 where the distance between the first and second tabs 326, 330 can increase from the first distance at the first portion 354, to a second, greater distance. In the example provided, the second portion 358 consists of first and second ramped surfaces 362, 366 that converge toward the first portion 354 of the trough 350. The first and second tabs 326, 330 have a thickness that is less than the thickness of the main body 322, such that the first and second tabs 326, 330 are spaced apart from the recessed surface 58 when the main body 322 is received in the cavity 54.

The anchor 334 includes an anchor shaft 370 and an anchor head 374. The anchor shaft 370 is coupled to the interior face 346 of the main body 322 and extends outwardly therefrom.

The anchor head 374 has a diameter larger than that of the anchor shaft 370. The tether 318 has a first tether end 378 and a second tether end 382. The first tether end 378 can be tied to, looped around, and/or otherwise attached to the anchor shaft 370. The anchor head 374 retains the first tether end 378 on the anchor shaft 370. In the example provided, the first tether end 378 is looped around the anchor shaft 370 such that the tether 318 is free to rotate about the anchor shaft 370.

The fastener 338 is configured to couple the main body 322 to the pillar trim panel 42 and position the main body 322 within the cavity 54. In the example provided, the fastener 338 is a push-in, Christmas tree style fastener fixedly coupled to the main body 322, though other types of fasteners can be used. The fastener 338 has a plurality of flanges 386 that are angled toward the main body 322 and have a diameter wider than the aperture 62 in the pillar trim panel 42. The flanges 386 are configured to bend or compress to be pressed through the aperture 62 in the pillar trim panel 42. The flanges 386 are configured to expand upon penetrating through the aperture 62 to the exterior side 50 of the pillar trim panel 42 to inhibit the removal of the fastener 338 from the aperture 62. The fastener 338 is coupled to the main body 322 such that the fastener 338 inhibits the main body 322 from being removed from the cavity 54.

The seatbelt router 314 is configured to be releasably coupled to the chest portion 138 of the seatbelt 106. The seatbelt router 314 includes a base 390, a second anchor 394, a pair of prongs 398, 402, and a stowage member or mount 406. In the example provided, the seatbelt router 314 is a unitarily formed thermoplastic material, though other configurations and/or materials can be used. The second anchor 394 is fixedly coupled to the base 390 and configured to couple the second tether end 382 to the base 390. In the example provided, the second anchor 394 is a tube shape and the second tether end 382 is received within the tube shaped second anchor 394. The second anchor 394 is crimped down on the second tether end 382 to retain the second tether end 382 within tube-shaped second anchor 394 through compression of the second tether end 382, though other methods of coupling the tether 318 to the base 390 can be used. In the example provided, the second tether end 382 is fixedly coupled to the base 390 and the first tether end 378 is rotatably coupled to the receiver 310, though other configurations can be used. In the example provided, the second anchor 394 is coupled to the base 390 at a first longitudinal end 410 of the base 390 such that the second tether end 382 extends from the second anchor 394 away from a second longitudinal end 414 of the base opposite the first longitudinal end 410.

The prongs 398, 402 extend from the opposite longitudinal ends 410, 414 of the base 390 and away from a first side 418 of the base 390 to define a main channel 422. The prongs 398, 402 then extend toward each other, spaced apart from the first side 418 of the base 390, to cover a portion of the main channel 422. The prongs 398, 402 extend toward each other to define a gap 426 between the prongs 398, 402. In this way, the base 390 and prongs 398, 402 form a generally "C" shaped cross-section. The main channel 422 has a width that is greater than or equal to a width of the seatbelt 106 and a thickness that is greater than or equal to a thickness of the seatbelt 106 such that the seatbelt 106 can be received within the main channel 422. The gap 426 has a width that is less than the width of the seatbelt 106 and greater than the thickness of the seatbelt 106. In this manner, the seatbelt 106 can be inserted into the main channel 422 through the gap 426 so that the seatbelt router 314 can slidably retain the seatbelt 106 within the main channel 422. The gap 426 also allows the occupant to remove the seatbelt 106 from the seatbelt router 314.

The mount 406 is configured to releasably couple the seatbelt router 314 to the receiver 310. The mount 406 includes a shaft or protrusion 430, and a bulb or hitch 434. In the example provided, the mount 406 also includes a nub 438. The protrusion 430 is coupled to the base 390 at a second side 442 of the base 390, opposite the first side 418, and extends outward from the second side 442. In the example provided the protrusion 430 is a generally cylindrical shape. The protrusion 430 has a diameter that is less than or equal to the distance between the first and second tabs 326, 330 at the first portion 354 such that the protrusion 430 can be received in the trough 350 at the first portion 354. Alternatively, the protrusion 430 can be a diameter greater than the first and second tabs 326, 330 and the first and second tabs 326, 330 and/or the protrusion 430 can be at least partially formed of a compressible material, such as foam, rubber, or compressible plastic, for example. Compression of the compressible material allows the protrusion 430 to be received in and retained in the first portion 354 of the trough 350 and can dampen vibrations of the seatbelt router 314 relative to the base 390.

The bulb 434 is spaced apart from the base 390 by the protrusion 430 and has a diameter wider than the protrusion 430 and wider than the first portion 354 of the trough 350, but narrower than the cavity 54, such that the bulb 434 is receivable within the cavity 54. In the example provided, the bulb 434 is a generally cylindrical shape. The protrusion 430 extends from the base 390 a length that is greater than the thickness of the first and second tabs 326, 330 such that the bulb 434 is positioned between the first and second tabs 326, 330 and the recessed surface 58 when the main body 322 is received in the cavity 54 and the protrusion 430 is received in the trough 350.

The nub 438 is formed of a compressible material, such as foam or rubber, and is fixedly coupled to the bulb 434 on a side distal to the protrusion 430. The nub 438 extends outwardly from the bulb 434 a distance such that when the main body 322 is received in the cavity 54 and the protrusion 430 is received in the trough 350, the nub 438 compresses against the recessed surface 58 to inhibit relative motion and rattling between the seatbelt router 314, the receiver 310, and the pillar trim panel 42.

As described above, the tether 318 is attached to the base 390 of the seatbelt router 314 at the second tether end 382 and to the receiver 310 at the first tether end 378. The tether 318 is a resilient cable having a natural length. The tether 318 is formed of a resilient material or constructed such that the tether 318 is stretchable to lengths greater than the natural length and such that the tether 318 is biased to return to the natural length. In this way, the tether 318 is configured to bias the seatbelt router 314 toward the pillar trim panel 42 when the receiver 310 is mounted to the pillar trim panel 42 and the tether 318 is in an extended position (FIG. 1), i.e., when the tether 318 is extended longer than the natural length away from the receiver 310.

In operation, when the seatbelt 106 is in the connected position (FIG. 1) and the seatbelt 106 is received in the main channel 422 of the seatbelt router 314, the seatbelt router 314 can be in the extended position. When seatbelt router 314 is in the extended position, the tether 318 provides sufficient force to pull the seatbelt router 314 and the chest portion 138 of the seatbelt 106 toward the pillar 22. The angle at which the tether 318 pulls on the seatbelt router 314 causes the seatbelt 106 to frictionally engage with the base 390 and the prongs 398, 402 within the main channel 422 to inhibit the seatbelt router 314 from sliding relative to the seatbelt 106. While not specifically shown, the base 390 and/or the prongs 398, 402 can optionally include a non-slip surface to enhance this frictional engagement. The frictional engagement however, is insufficient to prevent the occupant from adjusting the position of the seatbelt router 314 along the chest portion 138 of the seatbelt 106. In operation, the occupant positions the seatbelt router 314 along the chest portion 138 of the seatbelt 106 such that the chest portion 138 is pulled toward the pillar 22 to properly position across the occupant's chest, such as diagonally from the occupant's shoulder to the occupant's waist.

When the occupant disconnects the buckle 114 from the mating buckle 122, with the seatbelt 106 still received in the main channel 422 of the seatbelt router 314, the tether 318 pulls the seatbelt 106 toward the pillar 22. The occupant can then place the restraint positioner 38 into the stowed position (FIGS. 2 and 4) with the seatbelt 106 still received in the seatbelt router 314. To place the restraint positioner 38 in the stowed position, the bulb 434 and nub 438 portion of the mount 406 are moved into the cavity 54 above the first portion 354 of the trough 350 such that the bulb 434 is between the first and second tabs 326, 330 and the recessed surface 58 and the protrusion 430 is positioned above the trough 350. The seatbelt router 314 is then moved down until the protrusion 430 is seated in the first portion 354 of the trough 350. The ramped surfaces 362, 366 are configured to guide the protrusion 430 into the first portion 354 of the trough 350 as the restraint positioner 38 is moved into the stowed position.

When in the stowed position, the restraint positioner 38 holds the seatbelt 106 next to the pillar 22 to prevent the seatbelt 106 from becoming entangled or caught on the seat 30 or the occupant. With the restraint positioner 38 retaining the seatbelt 106 away from the seat 30 and proximate to the pillar 22, the upper support 70 is free to be reclined back or folded forward (FIG. 2), and the seat 30 is free to be moved in the forward or rearward directions 90, 94 (FIG. 1) without the seatbelt 106 becoming caught on the seat 30. Furthermore, the restraint positioner 38 also positions the seatbelt 106 against the pillar 22 such that the occupant is free to get into or out of the seat 30, enter or depart the vehicle 10 through the door 26, or otherwise move about the interior of the vehicle 10, without becoming tangled or caught on the seatbelt 106. To remove the restraint positioner 38 from the stowed position, the occupant lifts the seatbelt router 314 up until the protrusion 430 is removed from the first portion 354 of the trough 350 and the bulb 434 is clear of the trough 350. Then the seatbelt router 314 can be pulled outward from the receiver 310 to remove the bulb 434 from the cavity 54.

Figure 5:
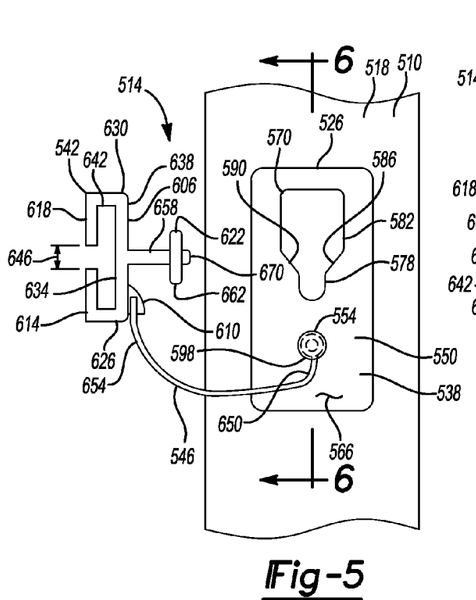
FIG. 5 is a front view of a portion of the pillar and seatbelt positioner of FIG. 2 having a receiver of a second construction.
Figure 6:
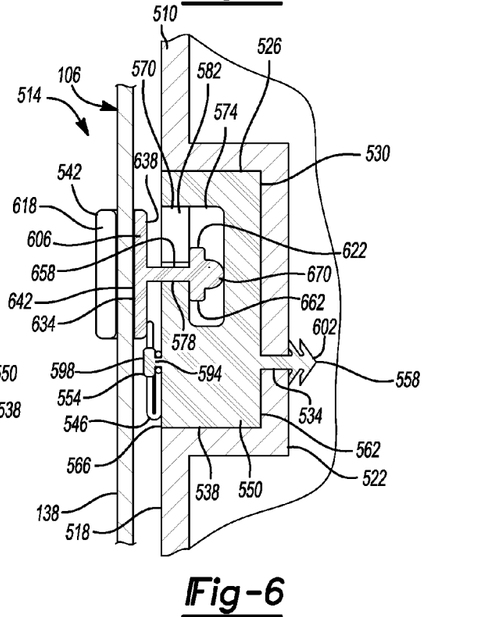
FIG. 6 is a sectional view of the seatbelt positioner of FIG. 5 taken along line 6-6, with the seatbelt router in a stowed position.

With reference to FIG. 5, a front view of a portion of a pillar trim panel 510 and a restraint positioner 514 of a second construction is shown. With additional reference to FIG. 6, a sectional view of the portion of the pillar trim panel 510 and seatbelt 106 is illustrated with the restraint positioner 514 in a stowed position. The structure and function of the pillar trim panel 510 can be similar or identical to that of the pillar trim panel 42 described above, apart from any differences described below and/or shown in the figures. The pillar trim panel 510 includes an interior side 518, exterior side 522, cavity 526, recessed surface 530, and aperture 534, that can be similar or identical to the interior side 46, exterior side 50, cavity 54, recessed surface 58, and aperture 62. Accordingly, similar features will not be described again in detail.

The restraint positioner 514 includes a receiver 538, a seatbelt router 542, and a tether 546. The receiver 538 includes a main body 550, an anchor 554, and a fastener 558. The main body 550 is configured to be received in the cavity 526 and mounted therein to the pillar trim panel 510. In the example provided, the main body 550 is a generally rectangular shape, though other shapes can be used. The main body 550 includes an exterior face 562 configured to oppose and abut the recessed surface 530, and an interior face 566 configured to be generally flush with the interior side 518 of the pillar trim panel 510 when the main body 550 is received in the cavity 526 and the exterior face 562 abuts the recessed surface 530.

The interior face 566 includes an orifice 570 that opens into a stowage cavity 574 defined by the main body 550. The orifice 570 has a first portion 578 that is a first width, and a second portion 582 that is a second width, greater than the first width. In the example provided, the orifice 570 includes a first and second ramped surface 586, 590 that narrows from the second portion 582 toward the first portion 578.

The anchor 554 includes an anchor shaft 594 and an anchor head 598. The fastener 558 has a plurality of flanges 602. The anchor 554 and fastener 558 can be similar or identical to the anchor 334 and fastener 338 described above, apart from any differences described below and/or shown in the figures. Accordingly, similar features will not be described again in detail.

The seatbelt router 542 and tether 546 can be similar or identical to the seatbelt router 314 and tether 318 described above, apart from any differences described below and/or shown in the figures. Accordingly, similar features will not be described again in detail. The seatbelt router 542 includes a base 606, a second anchor 610, a pair of prongs 614, 618, and a stowage member or mount 622, that can be similar or identical to the base 390, second anchor 394, prongs 398, 402 and mount 406 described above, apart from any differences described below and/or shown in the figures. The base 606 has a first and second longitudinal end 626, 630 that can be similar or identical to the longitudinal ends 410, 414 described above, apart from any differences described below and/or shown in the figures. The base 606 has a first and second side 634, 638 that can be similar or identical to the first and second sides 418, 442 described above, apart from any differences described below and/or shown in the figures. The prongs 614, 618 and base 606 define a main channel 642 that can be similar or identical to the main channel 422 described above, apart from any differences described below and/or shown in the figures. The prongs 614, 618 define a gap 646 between the prongs 614, 618 that can be similar or identical to the gap 426 described above, apart from any differences described below and/or shown in the figures. The tether 546 has a first tether end 650 and a second tether end 654, that can be similar or identical to the first and second tether ends 378, 382 described above, apart from any differences described below and/or shown in the figures. Accordingly, similar features will not be described again in detail.

The mount 622 includes a shaft or protrusion 658, and a bulb or hitch 662, that can be similar to the protrusion 430 and bulb 434 described above, apart from any differences described below and/or shown in the figures. In the example provided, the mount 622 also includes a nub 670, that can be similar or identical to the nub 438 described above, apart from any differences described below and/or shown in the figures. Accordingly, similar features will not be described again in detail. The protrusion 658 has a diameter that is less than or equal to the first width of the first portion 578 such that the protrusion 658 can be received in the first portion 578. In some configurations, the protrusion 658 can have a diameter greater than the first portion 578. In such a configuration, the first portion 578 and/or the protrusion 658 can be at least partially formed of a compressible material, such as foam, rubber, or compressible plastic, for example. Compression of the compressible material can allow the protrusion 658 to be received in and retained in the first portion 578 of the orifice 570, and can dampen vibration of the seatbelt router 542 relative to the main body 550.

The bulb 662 is spaced apart from the base 606 by the protrusion 658 and has a diameter wider than the protrusion 658 and wider than the first portion 578 of the orifice 570, but narrower than the second portion 582 and the stowage cavity 574, such that the bulb 662 is receivable within the stowage cavity 574 through the second portion 582 of the orifice 570. In the example provided, the bulb 662 is a generally cylindrical shape. The protrusion 658 extends from the base 606 a length that is greater than the thickness of the main body 550 between the interior face 566 and the stowage cavity 574 such that the bulb 662 is positioned in the stowage cavity 574 when the protrusion 658 is received in the first portion 578.

The nub 670 is formed of a compressible material, such as foam, rubber, or compressible plastic, for example. The nub 670 is fixedly coupled to the bulb 662 on a side distal to the protrusion 658. The nub 670 extends outwardly from the bulb 662 a distance such that when the bulb 662 is received in the stowage cavity 574 and the protrusion 658 is received in the first portion 578, the nub 670 compresses against the main body 550 to inhibit relative motion and rattling between the seatbelt router 542 and the receiver 538.

When the occupant disconnects the buckle 114 from the mating buckle 122, with the seatbelt 106 still received in the main channel 642 of the seatbelt router 542, the tether 546 pulls the seatbelt 106 toward the pillar 22. The occupant can then place the restraint positioner 514 into the stowed position (shown in FIG. 6 and similar to FIG. 2) with the seatbelt 106 still received in the seatbelt router 542.

Figure 7:
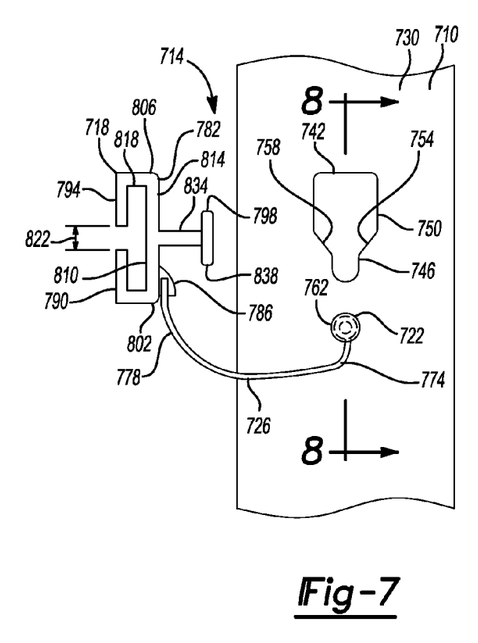
FIG. 7 is a front view of a pillar and a seatbelt positioner of a third construction.
Figure 8:
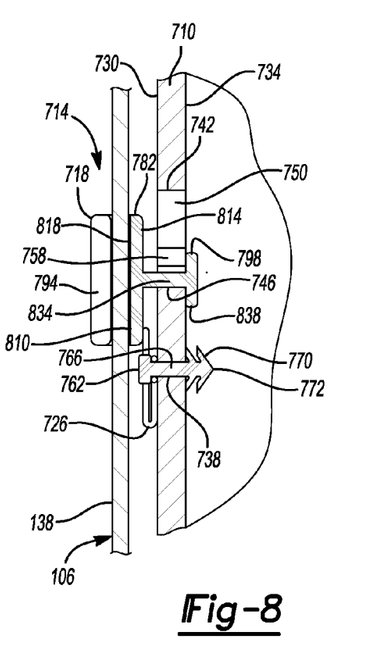
FIG. 8 is a sectional view of the pillar and seatbelt positioner of FIG. 7 taken along line 8-8, with a seatbelt router in a stowed position.

With reference to FIG. 7, a front view of a portion of a pillar trim panel 710 and a restraint positioner 714 of a third construction is shown. With additional reference to FIG. 8, a sectional view of the portion of the pillar trim panel 710, with the seatbelt 106 and restraint positioner 714 illustrated in a stowed position. The restraint positioner 714 includes a seatbelt router 718, an anchor 722, and a tether 726. The pillar trim panel 710 can be similar or identical to the pillar trim panel 42 described above, apart from any differences described below and/or shown in the figures. Accordingly, similar features will not be described again in detail.

The pillar trim panel 710 can be formed of a thermoplastic material, for example, and has an interior side 730 that faces generally into a passenger compartment or interior of the vehicle 10 and an exterior side 734 that faces generally away from the interior of the vehicle 10. The pillar trim panel 710 includes an aperture 738 and an orifice 742, which pass through the pillar trim panel 710 from the interior side 730 to the exterior side 734. The orifice 742 has a first portion 746 that is a first width, and a second portion 750 that is a second width, greater than the first width. In the example provided, the orifice 742 includes a first and second ramped surface 754, 758 that converge from the second portion 750 toward the first portion 746.

The anchor 722 is configured to couple the tether 726 to the pillar trim panel 710. In the example provided, the anchor 722 is a push-in, Christmas tree style fastener having an anchor head 762 and an anchor shaft 766 extending from the anchor head 762, though other types of fasteners can be used. The anchor head 762 has a diameter that is larger than a diameter of the anchor shaft 766. The anchor shaft 766 has a plurality of flanges 770 that are angled toward the anchor head 762 and have a diameter wider than a diameter of the aperture 738 in the pillar trim panel 710. The flanges 770 can bend or compress to be pressed through the aperture 738 in the pillar trim panel 710. The flanges 770 are configured to expand upon penetrating through the aperture 738 to the exterior side 734 of the pillar trim panel 710. The expanded flanges 770 can inhibit the removal of the anchor 722 from the aperture 738.

The tether 726 has a first tether end 774 and a second tether end 778. The first tether end 774 can be tied, looped, and/or otherwise attached to the anchor shaft 766. The anchor head 762 retains the first tether end 774 on the anchor shaft 766 when the anchor 722 is received in the pillar trim panel 710. In the example provided, the first tether end 774 is looped around the anchor shaft 766 such that the tether 726 is free to rotate about the anchor shaft 766.

The seatbelt router 718 and tether 726 that can be similar or identical to the seatbelt router 314 and tether 318 described above, apart from any differences described below and/or shown in the figures. The seatbelt router 718 includes a base 782, a second anchor 786, a pair of prongs 790, 794, and a stowage member or mount 798, that can be similar or identical to the base 390, second anchor 394, prongs 398, 402 and mount 406 described above, apart from any differences described below and/or shown in the figures. The base 782 has a first and second longitudinal end 802, 806 that can be similar or identical to the longitudinal ends 410, 414 described above, apart from any differences described below and/or shown in the figures. The base 782 has a first and second side 810, 814 that can be similar or identical to the first and second sides 418, 442 described above, apart from any differences described below and/or shown in the figures. The prongs 790, 794 and base 782 define a main channel 818 that can be similar or identical to the main channel 422 described above, apart from any differences described below and/or shown in the figures. The prongs 790, 794 define a gap 822 between the prongs 790, 794 that can be similar or identical to the gap 426 described above, apart from any differences described below and/or shown in the figures. Accordingly, similar features will not be described again in detail.

The mount 798 includes a shaft or protrusion 834, and a bulb or hitch 838, similar to the protrusion 430 and bulb 434. The protrusion 834 has a diameter that is less than or equal to the first width of the first portion 746 such that the protrusion 834 can be received in the first portion 746. In some constructions, the protrusion 834 can have a diameter that is greater than the first portion 746. In such a construction, the first portion 746 and/or the protrusion 834 can be at least partially formed of a compressible material, such as foam, rubber, or compressible plastic, for example, such that compression of the material allows the protrusion 834 to be received in and retained in the first portion 746 of the orifice 742.

The bulb 838 is spaced apart from the base 782 by the protrusion 834 and has a diameter wider than the protrusion 834 and wider than the first portion 746 of the orifice 742, but narrower than the second portion 750, such that the bulb 838 can be received through the second portion 750 of the orifice 742, but not the first portion 746. In the example provided, the bulb 838 is a generally cylindrical shape. The protrusion 834 extends from the base 782 a length that is greater than a thickness of the pillar trim panel 710 between the interior side 730 and the exterior side 734 such that the bulb 838 is positioned on the exterior side 734 when the protrusion 834 is received in the first portion 746.

In operation, when the seatbelt 106 is in the connected position (FIG. 1) and the seatbelt 106 is received in the main channel 818 of the seatbelt router 718, the tether 726 provides sufficient force to pull the seatbelt router 718 and the chest portion 138 of the seatbelt 106 toward the pillar 22. The angle at which the tether 726 pulls on the seatbelt router 718 causes the seatbelt 106 to frictionally engage with the base 782 and the prongs 790, 794 within the main channel 818 to inhibit the seatbelt router 718 from sliding relative to the seatbelt 106. While not specifically shown, the base 782 and/or the prongs 790, 794 can optionally include a non-slip surface to enhance this frictional engagement. The frictional engagement however, is insufficient to prevent the occupant from adjusting the position of the seatbelt router 718 along the chest portion 138 of the seatbelt 106. In operation, the occupant positions the seatbelt router 718 along the chest portion 138 of the seatbelt 106 such that the chest portion 138 is pulled toward the pillar 22 to properly position across the occupant's chest, such as diagonally from the occupant's shoulder to the occupant's waist.

When the occupant disconnects the buckle 114 from the mating buckle 122, with the seatbelt 106 still received in the main channel 818 of the seatbelt router 718, the tether 726 pulls the seatbelt 106 toward the pillar 22. The occupant can then place the restraint positioner 714 into the stowed position (FIG. 8 and similar to FIG. 2) with the seatbelt 106 still received in the seatbelt router 718. To place the restraint positioner 714 in the stowed position, the bulb 838 portion of the mount 798 is moved through the second portion 750 of the orifice 742 above the first portion 746 of the orifice 742 such that the bulb 838 is received on the exterior side 734 of the pillar trim panel 710 and the protrusion 834 is positioned above the first portion 746 of the orifice 742. The seatbelt router 718 is then moved down until the protrusion 834 is seated in the first portion 746 of the orifice 742. The ramped surfaces 754, 758 are configured to guide the protrusion 834 into the first portion 746 of the orifice 742 as the restraint positioner 714 is moved into the stowed position.

When in the stowed position, the restraint positioner 714 holds the seatbelt 106 next to the pillar 22 to prevent the seatbelt 106 from becoming entangled or caught on the seat 30 or the occupant. With the restraint positioner 714 retaining the seatbelt 106 away from the seat 30 and proximate to the pillar 22, the upper support 70 is free to be reclined back or folded forward (FIG. 2), and the seat 30 is free to be moved in the forward or rearward directions 90, 94 (FIG. 1) without the seatbelt 106 becoming caught on the seat 30. Furthermore, the restraint positioner 714 also positions the seatbelt 106 against the pillar 22 such that the occupant is free to get into or out of the seat 30, enter or depart the vehicle 10 through the door 26, or otherwise move about the interior of the vehicle 10, without becoming tangled or caught on the seatbelt 106. To remove the restraint positioner 714 from the stowed position, the occupant lifts the seatbelt router 718 up until the protrusion 834 is removed from the first portion 746 of the orifice 742 and the bulb 838 is clear of the first portion 746. Then the seatbelt router 718 can be pulled outward from the pillar trim panel 710 to remove the bulb 838 from the pillar trim panel 710 through the second portion 750.

The foregoing description of the embodiments has been provided for purposes of illustration and description. It is not intended to be exhaustive or to limit the disclosure. Individual elements or features of a particular embodiment are generally not limited to that particular embodiment, but, where applitether, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seatbelt positioner for a vehicle including a pillar and a seatbelt, the seatbelt positioner comprising:
   a receiver coupled to the pillar;
   a router including a guide body and a stowage member, said router being movable between an extended position in which said router is spaced apart from said receiver, and a stowed position in which said stowage member couples said guide body to said receiver and said guide body is configured to couple said router to a portion of the seatbelt; and
   a tether having a first end coupled to said router and a second end coupled to said receiver, and said tether biasing said router in a direction toward said receiver when said router is in said extended position.

2. The seatbelt positioner of claim 1, wherein said guide body is generally C-shaped, the portion of the seatbelt being removably received through an opening of said C-shaped guide body.

3. The seatbelt positioner of claim 2, wherein said stowage member is coupled to said guide body on a side of said guide body opposite said opening.

4. The seatbelt positioner of claim 1, wherein said receiver includes a pair of tabs spaced apart to define a trough;
   wherein said stowage member includes a protrusion and a hitch, said protrusion extending away from said side of said guide body, and said hitch being spaced apart from said guide body by said protrusion; and
   wherein said protrusion is received in said trough and said hitch is disposed on a side of said tabs opposite said guide body when said router is in said stowed position.

5. The seatbelt positioner of claim 4, wherein said hitch is wider than said trough to prevent axial translation of said router relative to said receiver when said router is in said stowed position.

6. The seatbelt positioner of claim 5, wherein said tabs further define a receiving aperture open to said trough, said receiving aperture widening with increased distance from said trough.

7. The seatbelt positioner of claim 1, wherein said tether is formed of a resilient material configured to be biased toward a first length when stretched to a second length, longer than said first length.

8. The seatbelt positioner of claim 1, wherein the stowage member includes a first portion and the receiver includes a second portion that contacts said first portion when said router is in said stowed position, and at least one of said first and second portions is formed of a resilient material.

9. The seatbelt positioner of claim 1, wherein said receiver is defined by a portion of the pillar.

10. The seatbelt positioner of claim 1, wherein said receiver is mounted to the pillar.

11. A seatbelt positioner for a vehicle including a pillar and a seatbelt, the seatbelt positioner comprising:
   a receiver coupled to the pillar;
   a router movable between an extended position and a stowed position, said router including:
      a guide body having a generally C-shape defining a main channel, said main channel being configured to retain a portion of the seatbelt; and
      a stowage member extending from said guide body; and
   a tether coupled to said router and said receiver;
   wherein said router is spaced apart from said receiver and biased in a direction toward said receiver when said router is in said extended position; and
   wherein said stowage member is received in said receiver and said guide body is configured to couple said router to the portion of the seatbelt when said router is in said stowed position.

12. The seatbelt positioner of claim 11, wherein said stowage member extends from a side of said guide body opposite said main channel.

13. The seatbelt positioner of claim 11, wherein said receiver includes a first aperture of a first width, and said stowage member includes a protrusion and a hitch, said protrusion having a second width, said hitch being spaced apart from said guide body by said protrusion and having a third width that is greater than said first and second widths; and wherein said protrusion is received in said first aperture and said hitch is disposed on a side of said first aperture opposite said guide body when said router is in said stowed position.

14. The seatbelt positioner of claim 13, wherein said receiver includes a second aperture open to said first aperture, said second aperture having a fourth width that is greater than said third width.

15. The seatbelt positioner of claim 14, wherein said first and second apertures are connected by a pair of ramps.

16. The seatbelt positioner of claim 11, wherein said tether is formed of a resilient material configured to be biased toward a first length when stretched to a second length, longer than said first length.

17. The seatbelt positioner of claim 11, wherein the stowage member includes a first portion and the receiver includes a second portion that contacts said first portion when said router is in said stowed position, and at least one of said first and second portions is formed of a resilient material.

18. The seatbelt positioner of claim 11, wherein said receiver is defined by a pillar trim panel.

19. The seatbelt positioner of claim 11, wherein said receiver is mounted to the pillar.

20. The seatbelt positioner of claim 11, wherein said tether is rotatably coupled to said receiver.

\* \* \* \* \*